US007901269B2

(12) United States Patent
Miura et al.

(10) Patent No.: US 7,901,269 B2
(45) Date of Patent: Mar. 8, 2011

(54) GRINDING APPARATUS FOR A PIN FOR USE IN POWER TRANSMISSION CHAIN AND MANUFACTURE METHOD OF A PIN FOR USE IN POWER TRANSMISSION CHAIN

(75) Inventors: Hiroyuki Miura, Nabari (JP); Takeshi Noguchi, Yamatotakada (JP)

(73) Assignee: Jtekt Corporation, Osaka-Shi (JP)

( * ) Notice: Subject to any disclaimer, the term of this patent is extended or adjusted under 35 U.S.C. 154(b) by 0 days.

(21) Appl. No.: 12/585,267

(22) Filed: Sep. 10, 2009

(65) Prior Publication Data

US 2010/0009600 A1 Jan. 14, 2010

Related U.S. Application Data

(62) Division of application No. 11/663,839, filed on Mar. 27, 2007, now Pat. No. 7,607,969.

(51) Int. Cl.
*B24B 49/00* (2006.01)
(52) U.S. Cl. .............................. 451/11; 451/178; 451/269
(58) Field of Classification Search .................... 451/11, 451/179–183, 241–258, 184, 188, 199, 167, 451/173, 210, 282, 306, 307, 541
See application file for complete search history.

(56) References Cited

U.S. PATENT DOCUMENTS

| 3,859,756 | A | | 1/1975 | Zerbola et al. | |
| 4,977,709 | A | * | 12/1990 | Siden | 451/541 |
| 5,182,971 | A | * | 2/1993 | Williams | 76/5.1 |
| 5,399,116 | A | | 3/1995 | Ellis et al. | |
| 5,496,208 | A | | 3/1996 | Neff | |
| 6,293,887 | B1 | | 9/2001 | Linnenbrugger et al. | |
| 6,435,951 | B1 | | 8/2002 | Ishizaka et al. | |
| 6,793,564 | B1 | | 9/2004 | Lupi et al. | |

FOREIGN PATENT DOCUMENTS

| JP | 57-83353 A | 5/1982 |
| JP | 61-25761 A | 2/1986 |
| JP | 3-47646 A | 2/1991 |
| JP | 3-84459 U | 8/1991 |
| JP | 4-54654 U | 5/1992 |
| JP | 2000-230606 A | 8/2000 |
| JP | 2004-190829 A | 7/2004 |
| JP | 2004-190830 A | 7/2004 |
| JP | 2005-308108 A | 11/2005 |
| WO | WO-02/04142 A1 | 1/2002 |

* cited by examiner

*Primary Examiner* — Dung Van Nguyen
(74) *Attorney, Agent, or Firm* — Birch, Stewart, Kolasch & Birch, LLP

(57) ABSTRACT

A disc-like grinding wheel 5 is formed with a circumferential groove 5a, the opposite walls of which define grinding surfaces 5b. A rotated carrier 3 brings a load pin 55 into rotary movement relative to the grinding wheel 5 rotated about an axis 5z, so as to pass the load pin 55 through space between the grinding surfaces 5b, whereby opposite end faces 55a of the load pin 55 are ground simultaneously. Thus, time taken by a grinding process may be reduced as compared with a conventional method wherein one end face is ground at a time.

7 Claims, 11 Drawing Sheets

US 7,901,269 B2

GRINDING APPARATUS FOR A PIN FOR USE IN POWER TRANSMISSION CHAIN AND MANUFACTURE METHOD OF A PIN FOR USE IN POWER TRANSMISSION CHAIN

This application is a Divisional of application Ser. No. 11/663,839, filed on Mar. 27, 2007 now U.S. Pat. No. 7,607,969 and for which priority is claimed under 35 U.S.C. §120. This application claims priority to Application No. 2004-30423 filed in Japan on Oct. 19, 2004 and Application No. 2004-315848 filed on Oct. 29, 2004 under 35 U.S.C. §119, the entire contents of which are hereby incorporated by reference.

TECHNICAL FIELD

The present invention relates to an apparatus for grinding a pin for use in power transmission chain and a manufacture method of the pin for use in power transmission chain.

BACKGROUND ART

In a continuously variable transmission for use in automotive vehicles (see, for example, Japanese Unexamined Utility Model Publication No. H3-84459) for example, a pair of conical pulleys (sheaves) 51, 52 are mounted to a driving shaft 50 shown in FIG. 10. One 51 of the conical pulleys is capable of being axially moved by a cylinder piston unit 53. The width of a groove defined between the conical pulley pair 51, 52 may be increased or decreased by such a movement of the pulley. A belt-like power transmission chain 56 is entrained between the conical pulley pair 51, 52. The groove width is increased or decreased whereby the power transmission chain 56 is moved toward the center of the conical pulleys 51, 52 or pushed toward outer sides of the pulleys, as making sliding contact with conical surfaces 51a, 52a of the conical pulleys 51, 52.

The power transmission chain 56 is formed by bendably interconnecting unit members into an endless belt form by means of load pins 55 (pins for use in power transmission chain), the unit member having a structure wherein thin plates called link plates 54 are overlapped on one another. The load pin 55 is formed by machining opposite ends of a flat-plate member in conformity to the conical surfaces 51a, 52a of the pulleys 51, 52. The load pin is adapted to make contact with the conical surfaces 51a, 52a of the pulleys 51, 52 at the opposite end faces thereof when the power transmission chain 56 is entrained between the conical pulley pair 51, 52. The power transmission chain 56 is adapted to transmit power by way of frictional force based on the contact between the load pins and the conical surfaces.

All the load pins 55 must be finished in an exact length and must have the opposite end faces finished in predetermined configurations. Therefore, the load pin 55 is subjected to a grinding process using a grinding wheel. FIG. 11 schematically shows the locations of members involved in the grinding process. FIG. 11(a) is a plan view and FIG. 11(b) is a side view. The grinding process is performed as follows. First, a bundle of load pins 55 are retained on a support portion 58 by means of a jig 57. In this state, one end face of each load pin is ground by a grinding wheel 59. Subsequently, the bundle is turned over and the other end face of each load pin is ground.

DISCLOSURE OF THE INVENTION

However, it takes a long time to grind all the opposite end faces of a large number of load pins constituting the whole length of chain.

In view of the foregoing problem, the present invention is directed to the reduction of time taken by the grinding process in the manufacture of the pins for use in the power transmission chain.

According to the invention, a grinding apparatus a for a pin for use in power transmission chain comprises: a grinding wheel portion which is a rotary member rotating about an axis parallel to a Z-direction provided that three directions orthogonal to one another are defined as an X-direction, a Y-direction and the Z-direction, and which includes a pair of grinding surfaces at an outer circumferential area thereof for simultaneously grinding opposite end faces of a pin for use in power transmission chain as a grinding subject; and a carrier which supports the pin for use in power transmission chain in parallel to the Z-direction as allowing the opposite end faces of the pin to project therefrom, and which moves the pin for use in power transmission chain relative to the grinding surfaces on an X-Y plane, thereby passing the pin for use in power transmission chain through space between the pair of rotated grinding surfaces.

The grinding apparatus of the above constitution simultaneously grinds the opposite end faces of the pin for use in power transmission chain by means of the rotating grinding surfaces. Thus, the time taken by the grinding process may be reduced as compared with a case where one end face is ground at a time.

According to another aspect of the invention, a grinding apparatus for a pin for use in power transmission chain comprises: a grinding wheel portion which is a rotary member rotated about a first axis parallel to a Z-direction provided that three directions orthogonal to one another are defined as an X-direction, a Y-direction and the Z-direction, and which includes a pair of grinding surfaces at an outer circumferential area thereof for simultaneously grinding opposite end faces of a pin for use in power transmission chain as a grinding subject; and a carrier which supports the pin for use in power transmission chain in parallel to the Z-direction as allowing the opposite end faces of the pin to project therefrom, and which rotates about a second axis extending in parallel to the first axis and spaced away therefrom on an X-Y plane, thereby passing the pin for use in power transmission chain through space between the pair of rotating grinding surfaces.

The grinding apparatus of the above constitution simultaneously grinds the opposite end faces of the pin for use in power transmission chain by means of the rotating grinding surfaces. Furthermore, the formation of a centrally protruded configuration on the respective opposite end faces of the pin may be accomplished by rotating the carrier, the centrally protruded configuration depending upon a radius defined between the second axis and the pin for use in power transmission chain.

In the above grinding apparatus, the grinding wheel portion is shaped like a disc and the grinding surfaces thereof are defined by axially opposite walls of a circumferential groove formed in an outer periphery of the grinding wheel portion.

In this case, both of the grinding surfaces belong to a single grinding wheel and hence, grinding precisions may be easily achieved.

The above grinding apparatus may also have a constitution wherein the grinding wheel portion is shaped like a disc and the grinding surfaces thereof are defined by axially opposite walls of a circumferential groove formed by cutting inwardly an outer periphery of the grinding wheel portion and are conically inclined.

Furthermore, the grinding wheel portion may comprise a pair of grinding wheels having the same configuration and opposing each other as defining a predetermined gap between the grinding surfaces thereof.

The carrier may also be a disc-like member formed with notches at an outer periphery thereof at regular space intervals.

According to the invention, a manufacture method of a pin for use in power transmission chain comprises a procedure for grinding opposite end faces of a pin for use in power transmission chain, wherein a grinding wheel portion including a pair of grinding surfaces at an outer circumferential area thereof for simultaneously grinding the opposite end faces is rotated about an axis parallel to a Z-direction provided that three directions orthogonal to one another are defined as an X-direction, a Y-direction and the Z-direction while a carrier supports the pin in parallel to the Z-direction as allowing the opposite end faces of the pin to project from the carrier, and wherein the carrier moves the pin for use in power transmission chain relative to the grinding surfaces on an X-Y plane thereby passing the pin for use in power transmission chain through space between the pair of rotated grinding surfaces.

The above manufacture method permits the opposite end faces of the pin for use in power transmission chain to be simultaneously ground by the rotated grinding surfaces.

According to another aspect of the invention, a manufacture method of a pin for use in power transmission chain comprises a procedure for grinding opposite end faces of a pin for use in power transmission chain, wherein a grinding wheel portion including a pair of grinding surfaces at an outer circumferential area thereof for simultaneously grinding the opposite end faces is rotated about a first axis parallel to a Z-direction provided that three directions orthogonal to one another are defined as an X-direction, a Y-direction and the Z-direction, while a carrier supports the pin in parallel to the Z-direction as allowing the opposite end faces of the pin to project from the carrier, and wherein the carrier is rotated about a second axis extending in parallel to the first axis and spaced away therefrom on an X-Y plane whereby the pin for use in power transmission chain is passed through space between the pair of rotated grinding surfaces.

The above manufacture method permits the opposite end faces of the pin for use in power transmission chain to be simultaneously ground by the rotated grinding surfaces. Furthermore, the formation of a centrally protruded configuration on the respective opposite end faces of the pin may be accomplished by rotating the carrier, the centrally protruded configuration depending upon a radius defined between the second axis and the pin for use in power transmission chain.

The above manufacture method may also have a constitution wherein the carrier, normally rotated at a high speed, is rotated at a low speed only when the pin for use in power transmission chain is passed through space between the grinding surfaces.

In the manufacture method, it is also possible to perform an infeed grinding process in which the grinding wheel portion is moved to the carrier for cutting.

The manufacture method may also have a constitution wherein the pin for use in power transmission chain is passed through space between the pair of grinding surfaces as vertically moved.

According to still another aspect of the invention, a grinding apparatus for a pin for use in power transmission chain comprises: a grinding wheel portion which is a rotary member including a pair of grinding surfaces at an outer circumferential area thereof for simultaneously grinding opposite end faces of a pin for use in power transmission chain as a grinding subject; and a carrier which includes a pin retainer for retaining the pin in parallel to a rotary axis of the grinding wheel portion as allowing the opposite end faces of the pin to project from the pin retainer, and which is rotated about an axis parallel to the rotary axis of the grinding wheel portion thereby passing the pin retained by the pin retainer through space between the pair of rotated grinding surfaces, the pin retainer including: a pin retaining surface against which a side surface of the pin is pressed and which extends in parallel to the rotary axis of the grinding wheel portion and intersects a direction of grinding the opposite end faces of the pin; and an elastically deformable holder member cooperating with the pin retaining surface to removably clamp the pin for use in power transmission chain pressed against the pin retaining surface.

In the grinding apparatus of the above constitution, the opposite end faces of the pin for use in power transmission chain are simultaneously ground by means of the pair of rotated grinding surfaces. Therefore, the time taken by the grinding process may be reduced as compared with the case where one end face is ground at a time.

Furthermore, the pin is retained with its side surface pressed against the pin retaining surface intersecting the grinding direction, so that a most of the grinding resistance exerted on the pin in conjunction with the grinding of the opposite end faces may be received by the pin retaining surface. Therefore, the pin need not to be clamped firmly and may be retained by means of a relatively simple constitution to clamp the pin between the pin retaining surface and the elastically deformable holder member. This constitution permits the pin to be easily mounted or dismounted without taking a complicated procedure.

It is preferred in the above grinding apparatus that the pin retaining surface is in contact with only opposite end portions of the pin for use in power transmission chain.

In this case, the pin is supported at two points of the opposite ends thereof and hence, the free play and the like of the pin may be suppressed. Thus, the pin may be retained in a stable position.

According to the above grinding apparatus, the pin retainer may be formed at place where a part of a periphery of the carrier is cut away.

The grinding apparatus may also have a constitution wherein a step portion continuously extending from the pin retaining surface to a step surface raised therefrom is formed and the pin for use in power transmission chain is pressed against the step portion. In this case, the positioning of the pin for use in power transmission chain may be accomplished by pressing the pin against the step portion.

The grinding apparatus may also have a constitution wherein the holder member is a leaf spring, a proximal end of which is fixed to the step surface and a distal end of which opposes the pin retaining surface via a gap therebetween. It is preferred that the gap is slightly smaller than a clamp dimension of the pin for use in power transmission chain clamped in the gap. This constitution provides for a proper elastic deformation of the holder member.

According to still another aspect of the invention, a manufacture method of a pin for use in power transmission chain using the above grinding apparatus for a pin for use in power transmission chain comprises a procedure for grinding the opposite end faces of the pin for use in power transmission chain, wherein the grinding wheel portion is rotated, wherein the pin for use in power transmission chain is clamped between the pin retaining surface and the holder member of the pin retainer so as to be retained in parallel to the rotary axis of the grinding wheel portion as projecting the opposite end faces thereof from the carrier, and wherein the carrier is rotated thereby passing the pin through space between the pair of rotated grinding surfaces.

The above manufacture method permits the opposite end faces of the pin for use in power transmission chain to be simultaneously ground by the rotated grinding surfaces. The method not only ensures that the pin is positively retained during the grinding process but also provides easy mounting/dismounting of the pin.

BEST MODES FOR CARRYING OUT THE INVENTION

Referring to the accompanying drawings, the following description will be made on a grinding apparatus for a pin for use in power transmission chain according to a first embodiment of the invention and a procedure for grinding opposite end faces of the pin in a manufacture method of the pin for use in power transmission chain.

Figure 1:
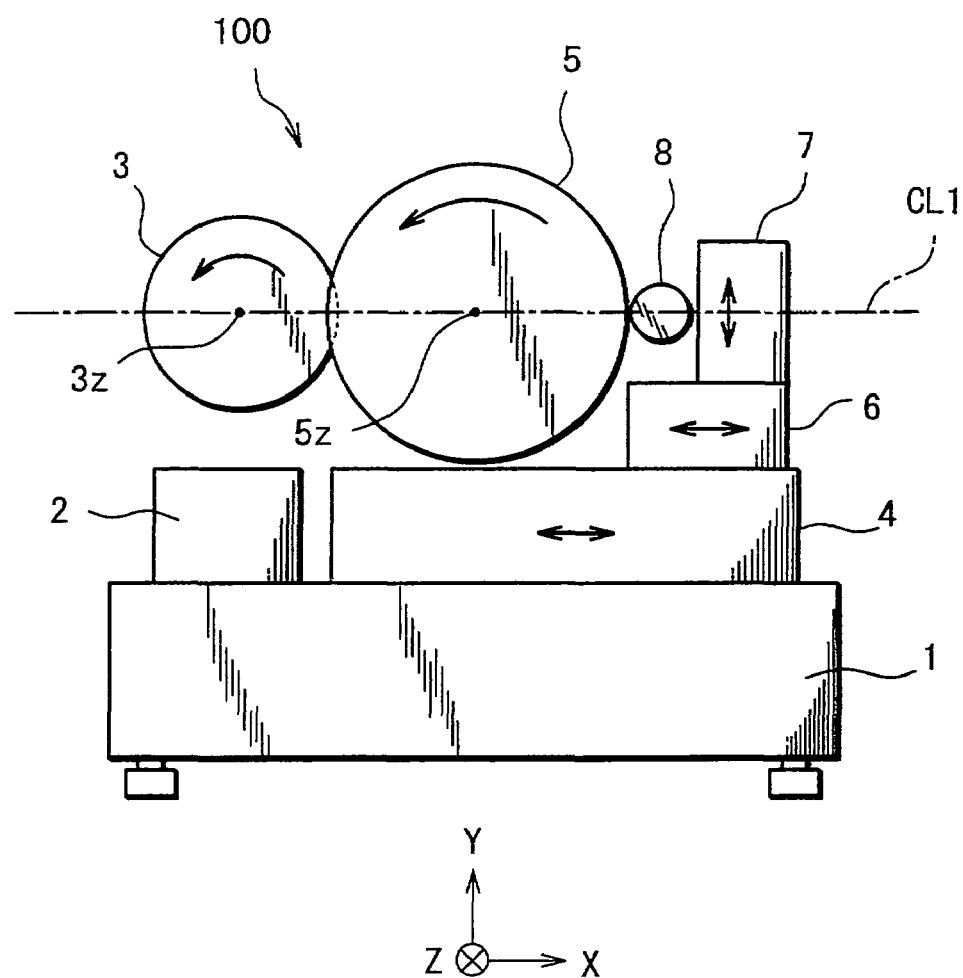
FIG. 1 is a front view schematically showing an outward appearance of a grinding apparatus for a pin for use in power transmission chain according to a first embodiment of the invention.

FIG. 1 is a plan view schematically showing an outward appearance of the grinding apparatus for a pin for use in power transmission chain. The explanation of the pin for use in power transmission chain is omitted because the description has already been made on FIG. 6(sic).

The horizontal, vertical and depth-wise directions mutually intersecting at right angles in FIG. 1 are defined as X-direction, Y-direction and Z-direction, respectively. A grinding apparatus 100 includes: a base 1; a carrier support 2 mounted to the base 1; a disc-like carrier 3 supported by the carrier support 2 in a manner to be rotatable about an axis 3z parallel to the Z-direction; a grinding wheel support 4 mounted to the base 1 in a manner to be movable in parallel to the X-direction; a grinding wheel 5 as a disc-like rotary member supported by the grinding wheel support 4 in a manner to be rotatable about an axis 5z parallel to the Z-direction; dresser supports 6, 7 mounted to the grinding wheel support 4 in a manner to be movable in parallel to the X-direction and the Y-direction, respectively; and a dresser 8 supported by the dresser supports 6, 7.

The carrier 3 and the grinding wheel 5 are each driven into a counterclockwise rotation by means of an unillustrated motor. The rotational speed of the carrier 3 is not constant. The carrier 3 may be rotated at two rotational speeds (high speed and low speed). The dresser 8 is also driven into rotation by means of an unillustrated motor. While the grinding wheel 5 and the dresser 8 are rotated, the dresser supports 6, 7 are moved to bring the dresser 8 into contact against the grinding wheel 5, whereby the grinding wheel 5 may be machined into a desired configuration. A standard position of the dresser 8 is on a center line CL1 extending in the X-direction and intersecting the axis 5z of the grinding wheel 5.

Now referring to FIG. 2, a detailed description is made on the carrier 3 and the grinding wheel 5 constituting an essential part of the grinding apparatus for a pin for use in power transmission chain according to the invention.

Figure 2A:
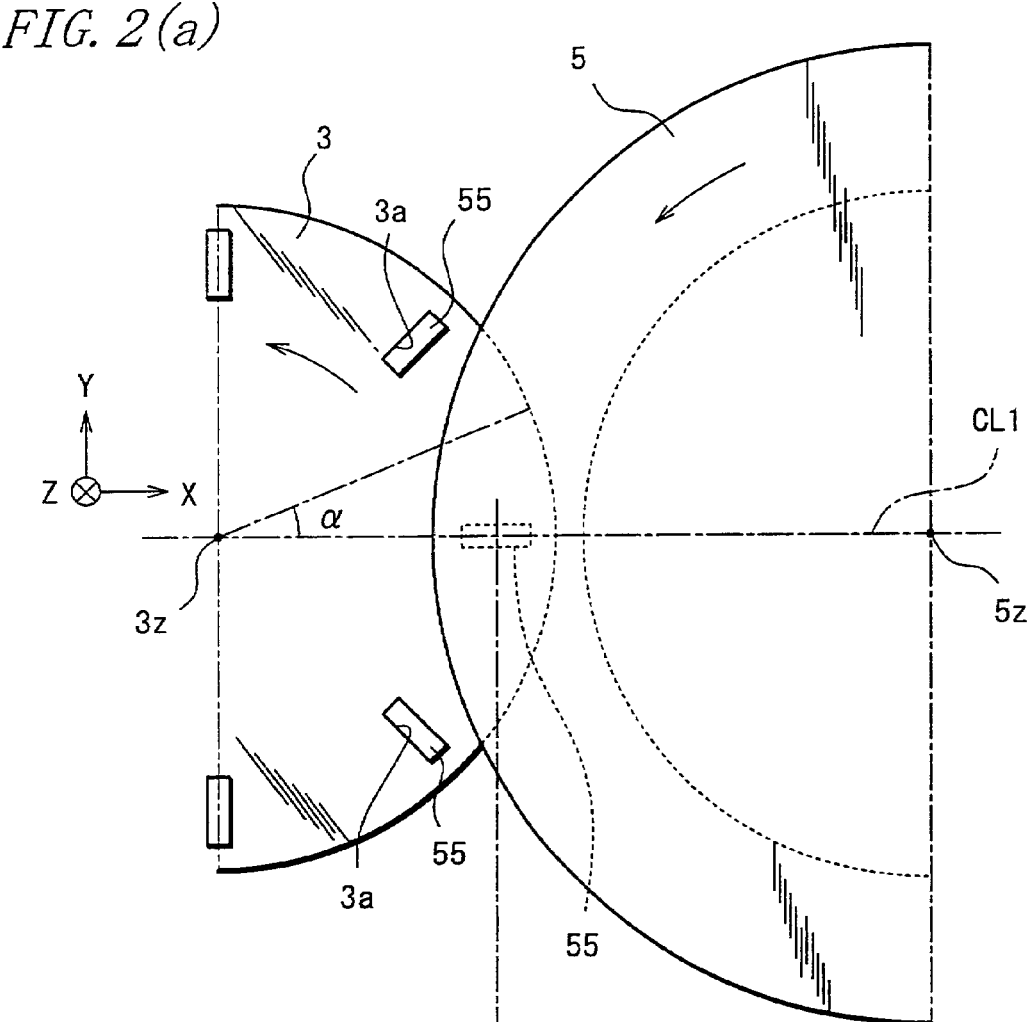
FIG. 2 is a group of fragmentary enlarged views showing a carrier and a grinding wheel of the grinding apparatus shown in FIG. 1.
Figure 2B:
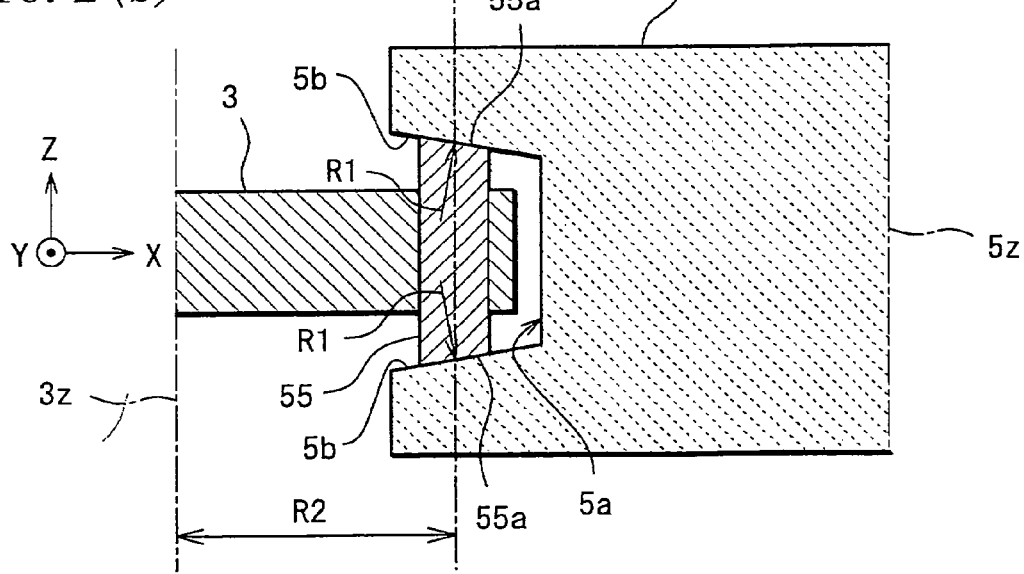

FIG. 2(a) is a fragmentary enlarged view of the carrier 3 and the grinding wheel 5 shown in FIG. 1. The axis 3z of the carrier 3 and the axis 5z of the grinding wheel 5 are on the same center line CL1 extending in the X-direction. FIG. 2(b) is a horizontal sectional view including the center line CL1 in FIG. 2(a). The carrier 3 is circumferentially formed with pockets 3a at regular space intervals. A load pin 55 (a pin for use in power transmission chain) is mounted in the pocket by using an unillustrated jig. The load pin 55 mounted in the pocket 3a of the carrier 3 is supported in parallel to the Z-direction as projecting its opposite end faces from the carrier 3.

On the other hand, the grinding wheel 5 is formed with a circumferential groove 5a in the vicinity of an outer periphery thereof. The circumferential groove is formed by cutting inwardly the outer periphery of the grinding wheel in a manner to define a trapezoidal sectional shape as shown in the figure. Axially opposite walls (Z, -Z directions) of the circumferential groove 5a constitute grinding surfaces 5b conically inclined. These grinding surfaces oppose each other in the Z-direction to define symmetric configurations. Referring to FIG. 2(b), a portion of the grinding surface 5b, which is responsible for grinding the load pin 55, is so finished as to have a curvature radius R1. The curvature radius R1 as well as an inclination of the grinding surface 5b and a Z-wise distance between the grinding surfaces 5b are so defined as to provide correct dimensions and configuration of the post-grinding load pin 55. A radius of rotation R2 as viewed from the axis 3z of the carrier 3 is defined by a distance between the axis of the carrier and the center of the load pin 55.

In a state where the grinding wheel 5 is rotated at a constant speed, the load pin 55 is ground by being passed through space between the pair of grinding surfaces 5b of the grinding wheel by means of the rotated carrier 3. In this process, the carrier 3 is rotated at the low speed to feed the next load pin 55 into space between the grinding surfaces 5b and to move the load pin through an angular range α where the load pin is actually ground by the grinding surfaces 5b. Otherwise, the carrier 3 is rotated at the high speed. As moved through the angular range α, the load pin 55 has its opposite end faces 55a simultaneously ground by the rotated grinding surfaces 5b.

Figure 3:
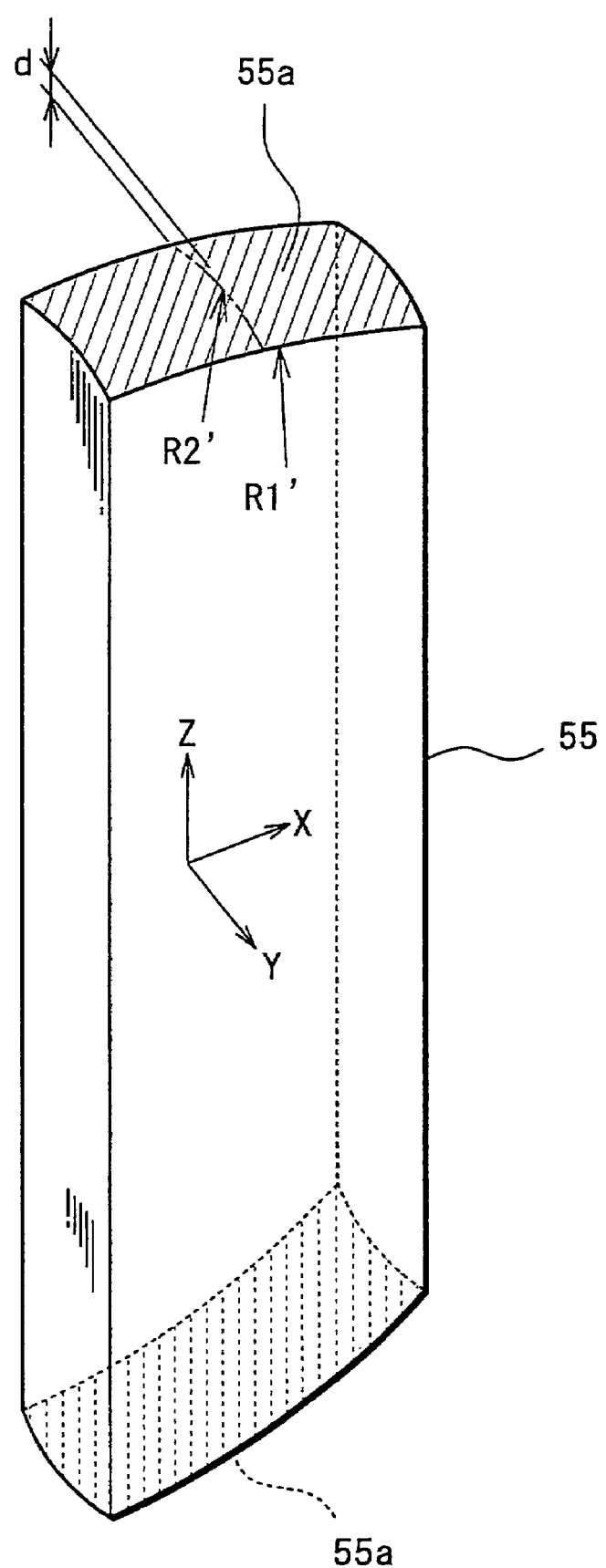
FIG. 3 is a perspective view showing a post-grinding load pin.

FIG. 3 is a perspective view showing post-grinding configurations of the upper and lower end faces of the load pin 55 shown in FIG. 2(b). The figure shows the X-, Y- and Z-directions on assumption that the load pin 55 is in the position shown in FIG. 2(b). In the figure, the upper end face 55a is inclined downward to the right and the lower end face 55a is inclined upward to the right because of the inclinations of the grinding surfaces 5b (FIG. 2(b)). Because of the configuration of the grinding surface 5b (such as the curvature radius R1), the end face 55a has a centrally protruded configuration having a mean curvature radius R1' with respect to a longitudinal direction thereof.

Figure 4:
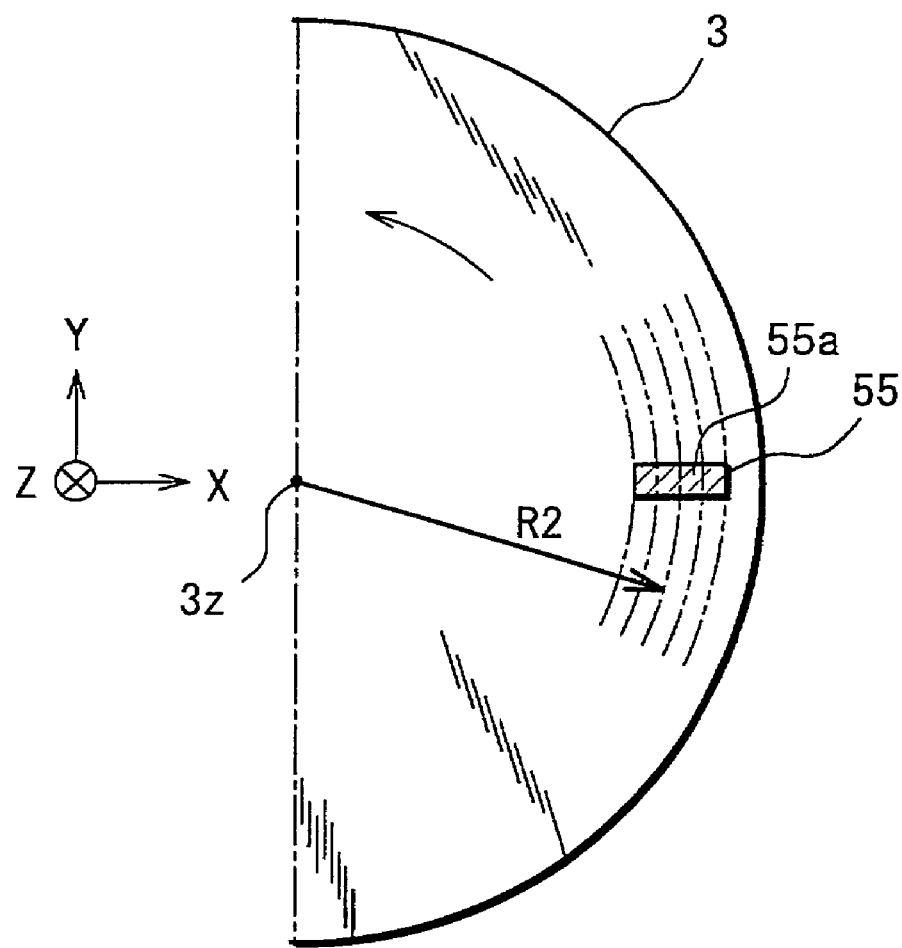
FIG. 4 is a diagram showing the carrier of FIG. 2 and an end face of a load pin as viewed in a Z-direction.
Figure 10:
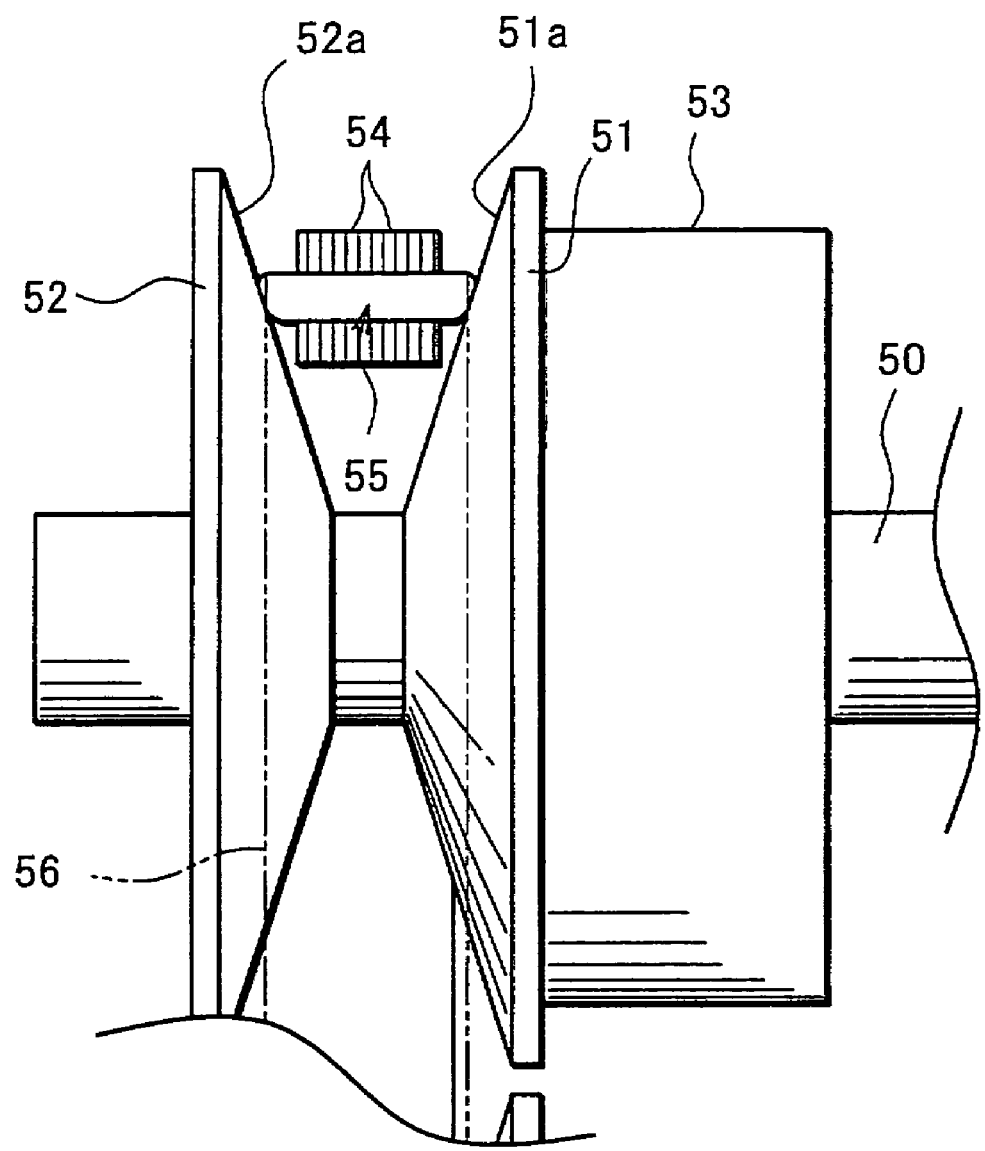
FIG. 10 is a diagram showing a power transmission chain entrained about a conical pulley of a driving shaft.
Figures 11A, 11B:
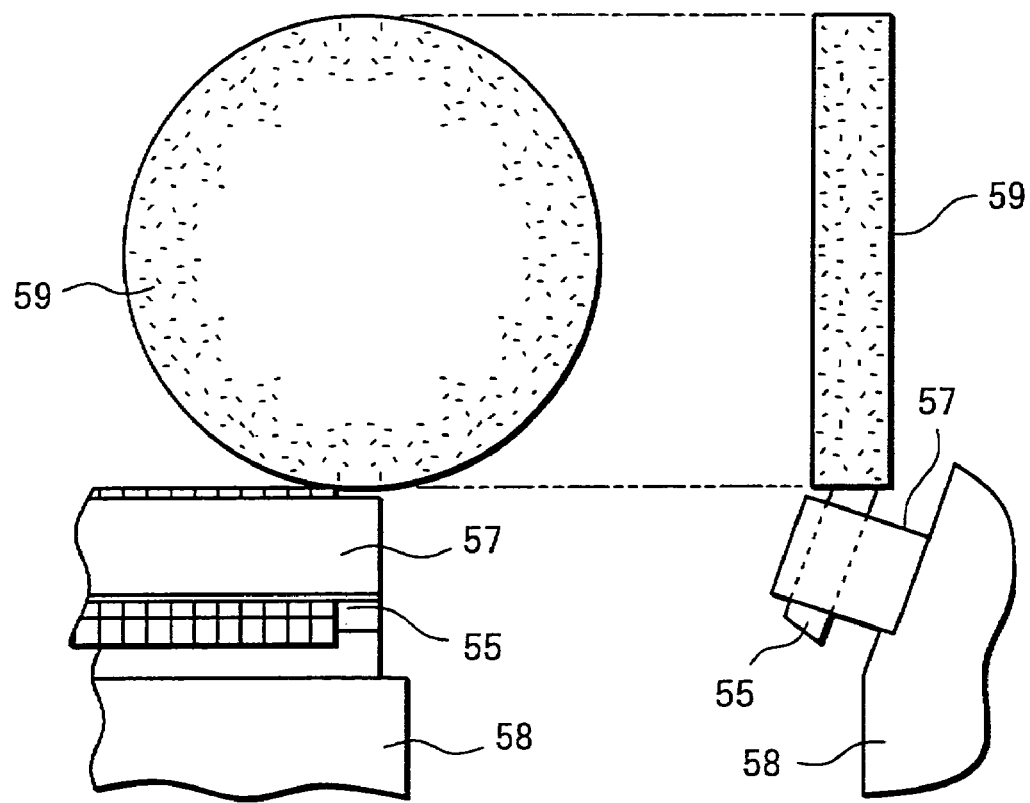
FIG. 11 is a group of diagrams showing, in plan view and side view, the locations of members involved in a conventional grinding process of the load pin.

On the other hand, FIG. 4 shows the carrier 3 of FIG. 2 and the end face 55a of the load pin 55 as viewed in the Z-direction. Because of the rotation of the carrier 3, any post-grinding contour line on the end face 55a as viewed in the Z-direction defines a concentric circle having a radius R2' on average. The radius R2' depends upon the radius of rotation R2 of the pin. In a case where R2 is in the range of 50 to 300 mm, for example, R2' is about five times as great as R2. As shown in FIG. 3, therefore, the end face 55a defines a three-dimensional curved surface having the curvature radius R1' with respect to the longitudinal direction and the curvature radius R2' (average value) with respect to a traverse direction. A quantity of central protrusion d defined by the curvature radius R2' is on the order of 1 µm when R2 is 150 mm, for example. Such a centrally protruded configuration contributes to the decrease of contact resistance between the load pin 55 and the conical pulleys 51, 52 (see FIG. 10). A relation between R2 and the quantity of central protrusion is such that the quantity of central protrusion is increased with the decrease of R2 or the quantity of central protrusion is decreased with the increase of R2.

In this manner, the opposite end faces 55a of the load pin 55 are simultaneously ground by the rotated grinding surfaces 5b. Furthermore, the opposite end faces 55a of the pin are ground into the centrally protruded configurations based on the radius R2 because of the rotation of the carrier 3, the radius R2 defined between the axis 3z of the carrier and the load pin 55. Thus, the centrally protruded configurations contributing to the decrease of contact resistance are simultaneously formed on the opposite end faces. Accordingly, the time taken by the grinding process may be reduced as compared with the conventional process wherein one end face is ground at a time. What is more, the load pin 55 may have its opposite end faces 55a ground at a time, without re-mounting the load pin to the carrier. Thus, the opposite end faces of the load pin may be ground with high precisions because the grinding process does not involve errors associated with the re-mounting of the pin.

According to the above embodiment, both of the grinding surfaces 5b belong to a single grinding wheel 5 so that the dimensional precisions of the circumferential groove 5a may be easily achieved. This facilitates the grinding of the load pin 55 with high precisions. It is noted, however, an alternative constitution may also be made, for example, wherein a pair of grinding wheels having the same constitution including the grinding surface 5b are prepared and are combined with each other in a manner that the respective grinding surfaces 5b thereof oppose each other via a predetermined gap therebetween. Thus, the grinding wheels as a whole may constitute a "grinding wheel portion" in the mode shown in FIG. 2(b).

The grinding process according to the embodiment is a through process (one-step finishing process) wherein the carrier 3 being rotated is passed through space between a pair of grinding surfaces 5b of the grinding wheel 5 rotated as fixed to place with respect to the X-direction. Alternatively, an infeed grinding process may also be adopted wherein the grinding wheel 5 is moved to the carrier 3 by slidably moving the grinding wheel support 4, so as to cut inwardly with respect to the carrier.

Figure 5:
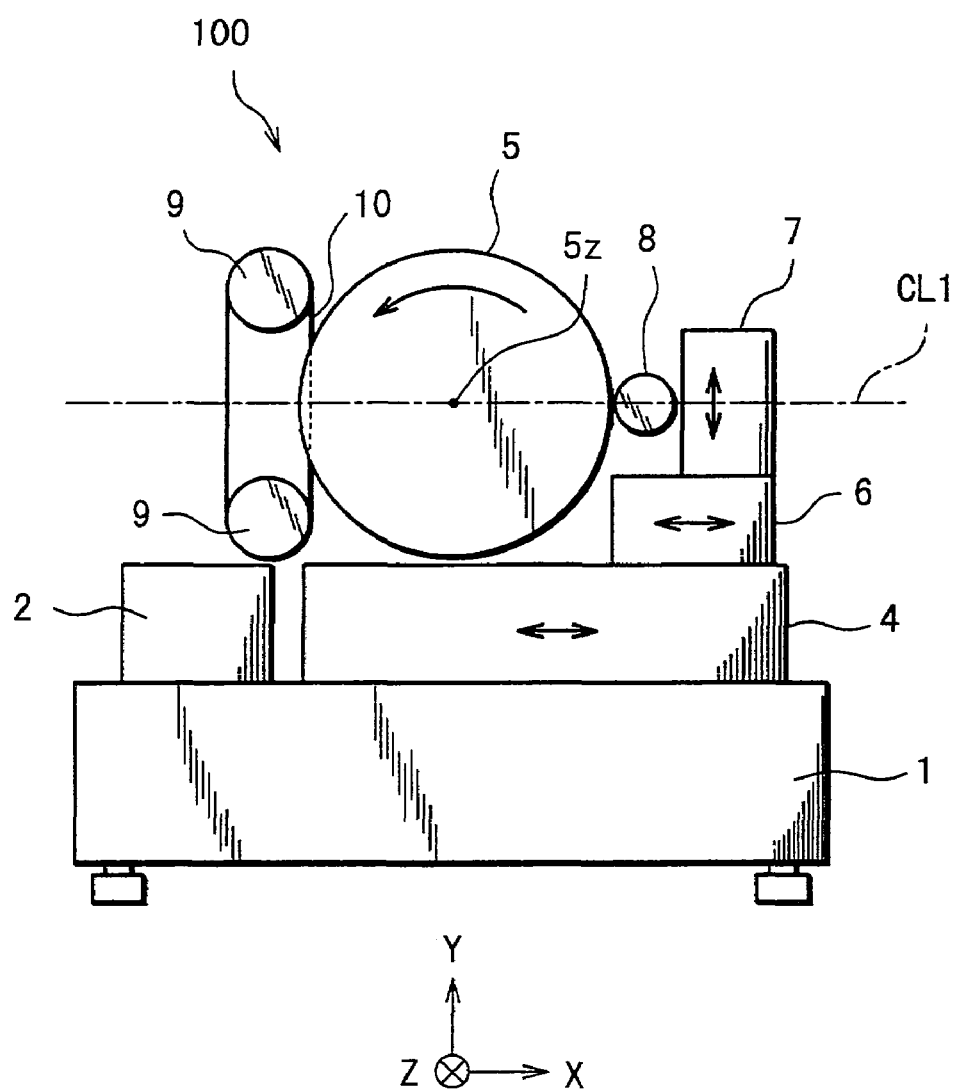
FIG. 5 is a front view schematically showing an outward appearance of another grinding apparatus for a pin for use in power transmission chain, which includes a carrier of a different constitution.

The above embodiment illustrates the constitution wherein the carrier 3 is rotated as retaining the load pins 55. As shown in FIG. 5, an alternative constitution may also be made wherein a conveyor-type carrier 10 is provided for vertical conveyance of the pins between upper and lower pulleys 9 and wherein the load pins mounted to the carrier 10 in parallel to the Z-direction are vertically moved to be passed through space between the grinding surface pair 5b. In this case, the aforesaid R2 is practically infinite and hence, the end face 55a is ground into a configuration which is free from the central protrusion with respect to the transverse direction. Any other constitution may also be made so long as the load pin and the grinding surfaces are moved relative to each other on an X-Y plane for allowing the load pin to pass through space between the grinding surfaces. An end-face configuration having an arbitrary curvature radius R2' may be obtained by changing the path of the above relative movement.

Now referring to the accompanying drawings, description is made on a grinding apparatus for a pin for use in power transmission chain according to a second embodiment of the invention and on a procedure of grinding the opposite end faces of the pin in a manufacture method of the pin for use in power transmission chain.

Figure 6:
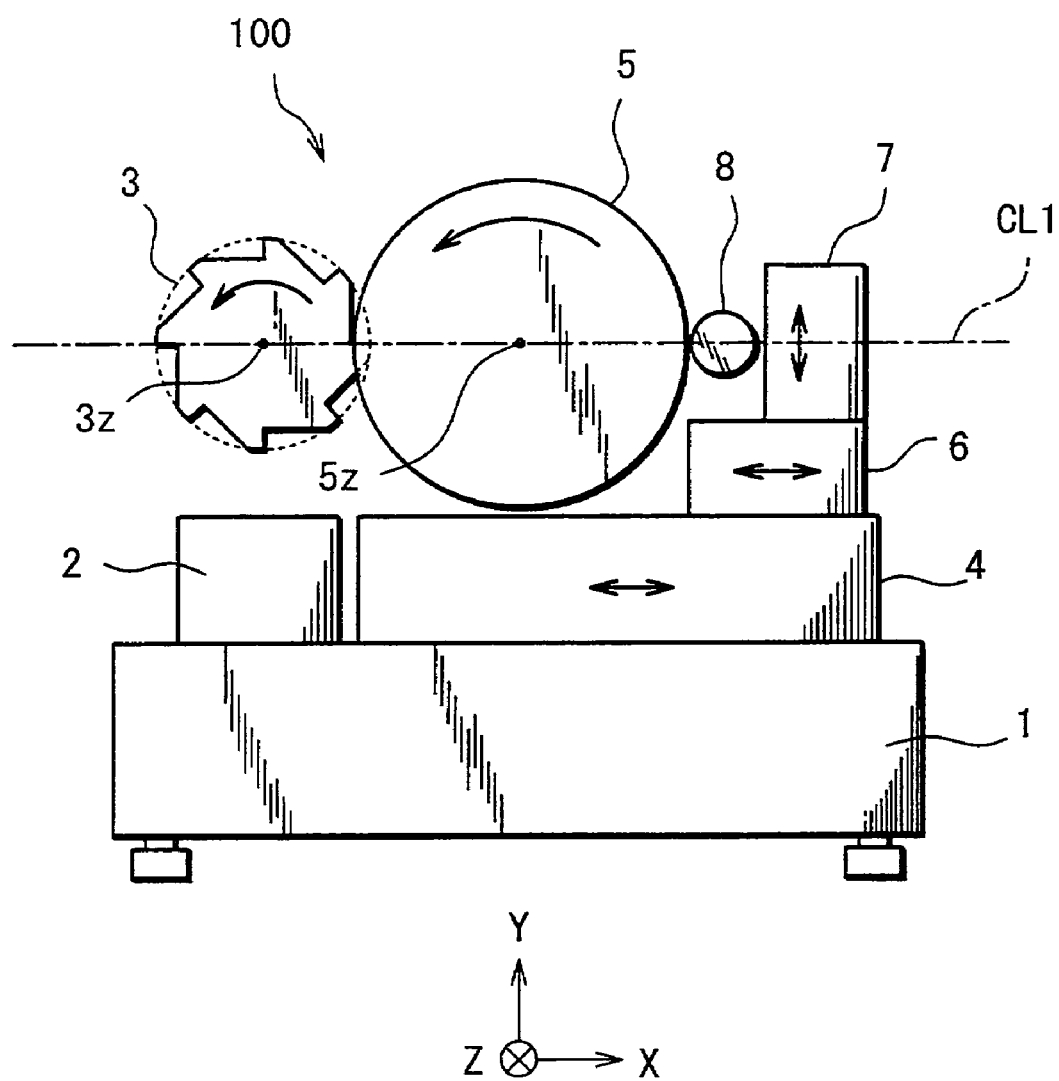
FIG. 6 is a front view schematically showing an outward appearance of a grinding apparatus for pin for use in power transmission chain according to a second embodiment of the invention.

FIG. 6 is a front view schematically showing an outward appearance of a grinding apparatus for a pin for use in power transmission chain. A difference from the first embodiment consists in the mode of the carrier 3. The carrier 3 according to the second embodiment is configured such that a disc-like member is formed with notches at an outer periphery thereof at regular space intervals. The carrier 3 is supported by the carrier support 2 in a manner to be rotatable about the axis 3z parallel to the Z-direction.

Figure 7:
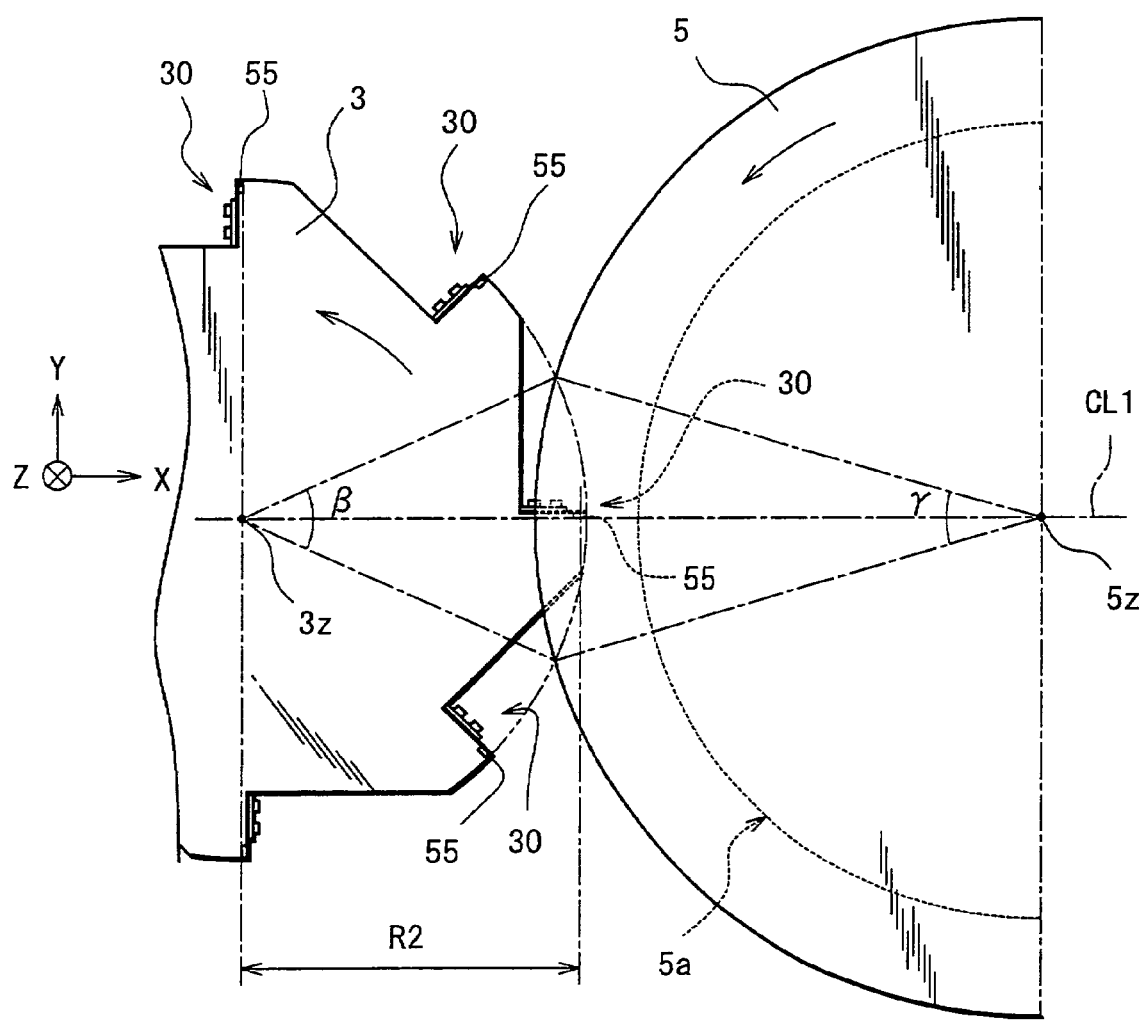
FIG. 7 is a fragmentary enlarged view showing a carrier and a grinding wheel of the grinding apparatus of FIG. 6.
Figure 8:
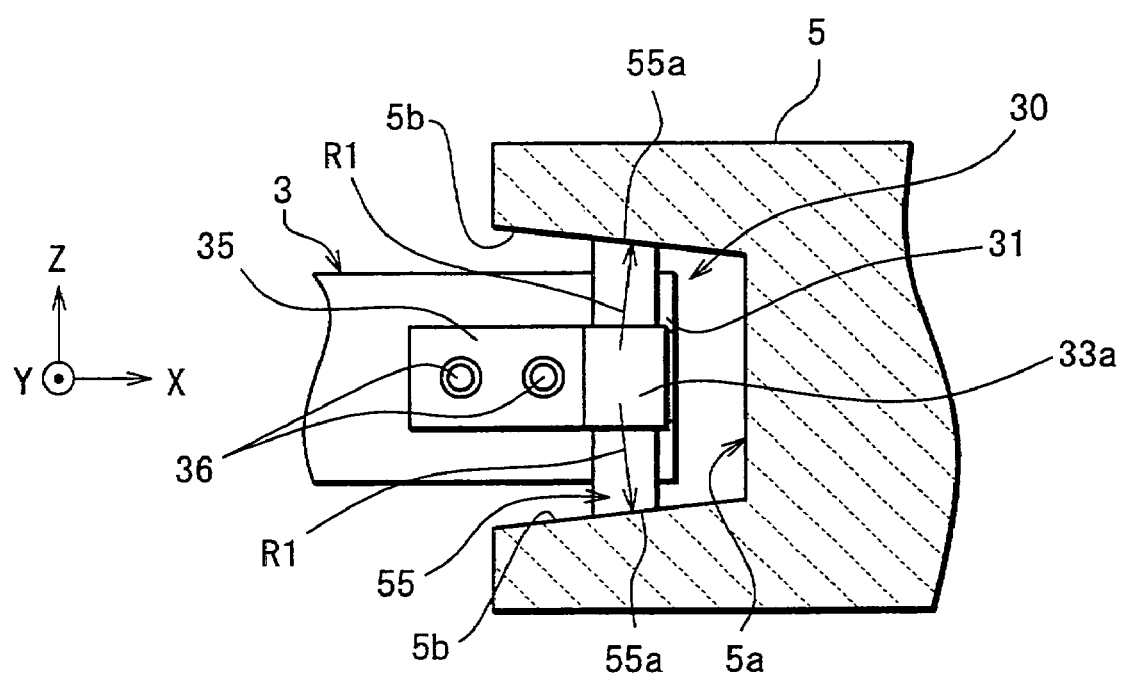
FIG. 8 is a horizontal sectional view of an essential part including a center line CL1 in FIG. 7.
Figure 9:
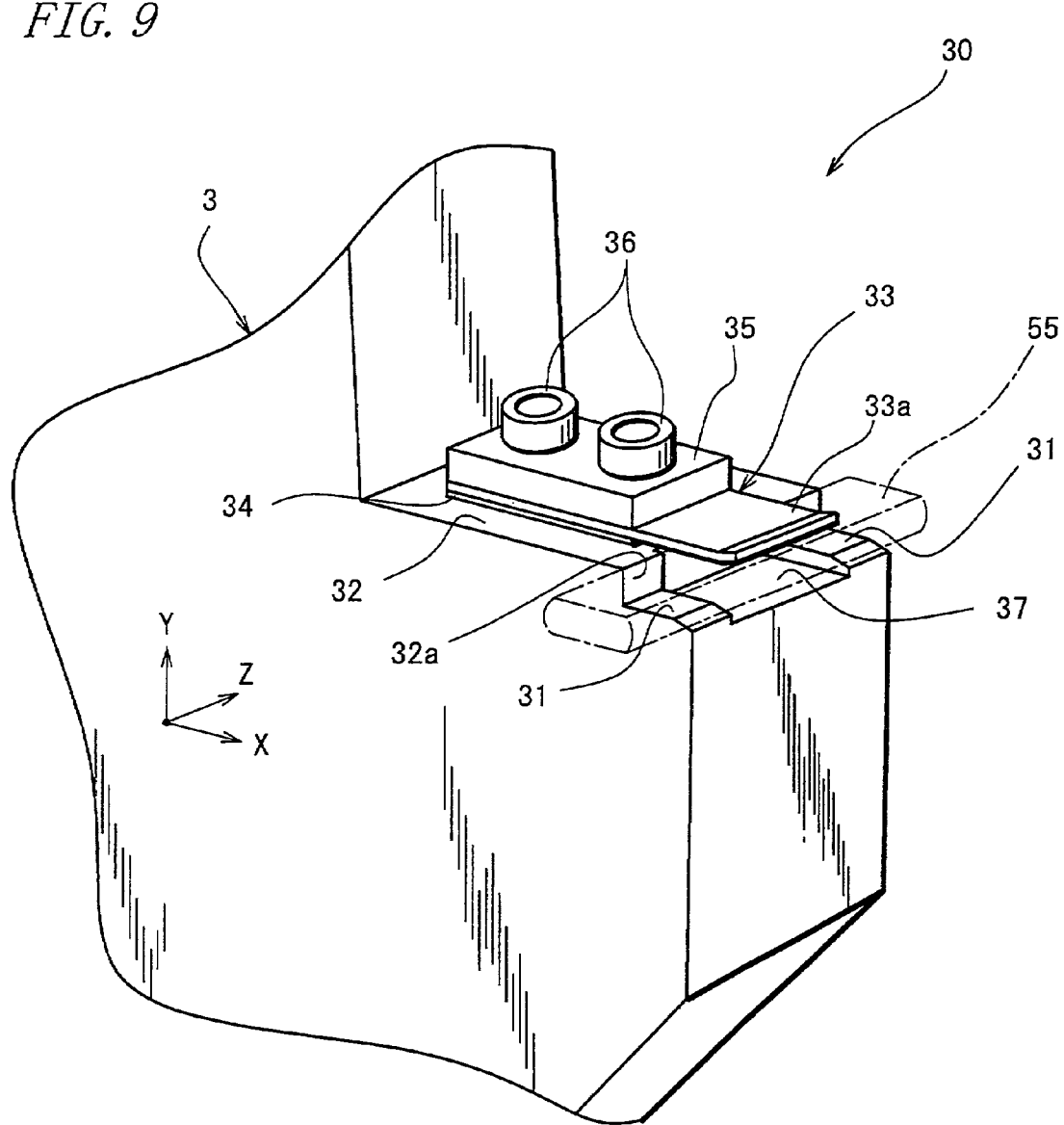
FIG. 9 is an enlarged perspective view showing a pin retainer.

Next, referring to FIG. 7 to FIG. 9, a detailed description is made on the carrier 3 and the grinding wheel 5 constituting the essential part of the grinding apparatus for a pin for use in transmission power chain according to the invention.

FIG. 7 is a fragmentary enlarged view showing the carrier 3 and the grinding wheel 5 shown in FIG. 6. The axis 3z of the carrier 3 and the axis 5z of the grinding wheel 5 are on the same center line CL1 extending in the X-direction. FIG. 8 is a horizontal sectional view of the essential part including the center line CL1 in FIG. 7. The carrier 3 includes eight pin retainers 30 which are circumferentially arranged with equal spacing and are each formed by cutting away a part of the periphery of the carrier. The load pins 55 (pins for use in power transmission chain) are retained on the carrier. The load pin 55 is retained by the pin retainer 30 in parallel to the Z-direction (axis 5z) as projecting its opposite end faces from the carrier 3.

The circumferential groove 5a and the grinding surfaces 5b of the grinding wheel 5 are constituted the same way as in the first embodiment. As shown in FIG. 7, the radius of rotation R2 as viewed from the axis 3z of the carrier 3 is defined by the distance between the axis of the carrier and the center of the load pin 55.

FIG. 9 is an enlarged perspective view showing the pin retainer 30. The pin retainer 30 includes: a pin retaining surface 31 extended along a radial line of the carrier 3 and in parallel to the axis 3z (axis 5z); and a plate-like holder member 33 fixed to a step surface 32 raised relative to the pin retaining surface 31. The load pin 55 is positioned as pressed against the pin retaining surface 31 and a step portion 32a at its side surfaces, the step portion 32a continuously extending from the pin retaining surface 31 to the step surface 32. The load pin 55 is clamped between the pin retaining surface 31 and the holder member 33 so as to be retained in parallel to the Z-direction as projecting its opposite end faces from the carrier 3.

The holder member 33 is a leaf spring formed from a spring steel and having a shape shown in the figure, for example. The holder member 33 has one-end portion thereof clamped between shims 34, 35 and secured to the step surface 32 with bolts 36, the one-end portion substantially accounting for one half of the member. The other-end portion of the holder member is projected from the step surface 32, thus defining a projecting portion 33a. The projecting portion 33a is designed to oppose the pin retaining surface 31 via a gap slightly smaller than an outer peripheral width of the load pin 55, the gap determined in a state where the load pin 55 is not clamped between the projecting portion and the pin retaining surface. Since the holder member 33 is the leaf spring, the projecting portion 33a thereof is adapted for a proper elastic deformation. Hence, the load pin 55 may be properly clamped by way of an elastic force arising from the elastic deformation of the holder member holding the load pin 55. Thus, the load pin 55 is retained by the pin retainer 30 in a manner to be readily mounted or removed therefrom.

A recess 37 is formed between a pair of pin retaining surfaces 31, so that a side surface (X-Z surface) of the load pin 55 is in contact against the pin retaining surfaces 31 at only two portions near the opposite ends of the pin. In this case, the load pin 55 is retained at two points spaced away from each other in the Z-direction and hence, the load pin may be retained in a stable position and besides, the free play and the like of the load pin 55 in the retained position may be minimized. Furthermore, a contact area between the pin retaining surface 31 and the load pin 31 is decreased so that the load pin 55 may encounter less resistance when mounted or removed. This further facilitates the mounting or dismounting of the load pin 55.

The load pin is ground as follows. In a state where the grinding wheel 5 is rotated at a constant speed, the carrier 3 is rotated for passing the load pin 55 through space between the grinding-surface pair 5b. In this process, the rotational speed of the grinding wheel 5 is set to a relatively high speed, whereas the rotational speed of the carrier 3 is set to a speed lower than that of the grinding wheel 5.

In the grinding wheel 5, the load pin 55 is passed through space between the grinding-surface pair-5b in an angular range γ shown in FIG. 7. On the other hand, the carrier 3 passes the load pin 55 through space between the grinding-surface pair 5b, as rotated through an angular range P. The pin retaining surface 31 of the pin retainer 30, as moved through the angular range β, is never oriented in parallel to a grinding direction (direction of force applied by grinding) of the grinding surface 5b in the angular range γ or is constantly oriented to intersect the grinding direction.

The load pin 55, as moved through the above angular range β, has its opposite end faces 55a simultaneously ground by the rotated grinding surfaces 5b. The post-grinding configurations of the upper and lower end faces of the load pin 55 are the same as those of the first embodiment, as shown in FIG. 3.

In this manner, the opposite end faces 55a of the load pin 55 are simultaneously ground by the rotated grinding surfaces 5b, while the carrier 3 is rotated for simultaneously forming the centrally protruded configurations, contributing to the decrease of contact resistance, on the opposite end faces.

Furthermore, the load pin 55 is retained with its side surface pressed against the pin retaining surface 31 intersecting in the grinding direction of the grinding surfaces 5b, so that the most of the grinding resistance exerted on the load pin 55 in conjunction with the grinding of the opposite end faces 55a may be received by the pin retaining surface 31. Therefore, the load pin 55 need not to be clamped as firmly as in the conventional method but may be retained by means of a relatively simple constitution to clamp the load pin between the pin retaining surface 31 and the elastically deformable holder member 33. This constitution permits the load pin to be easily mounted or dismounted without taking a complicated procedure.

The invention may achieve the reduction of the time taken by the grinding operation because the apparatus is adapted for simultaneous grinding of the opposite end faces 55a of the load pin 55 and also permits the load pin to be easily mounted or dismounted without taking the complicated procedure.

In the above grinding apparatus, it may be contemplated, for example, to replace the pin retainer 30 for retaining the load pin 55 with a hydraulic chuck such that the load pin 55 may be firmly retained in an easy-to-mount or remove manner and that the load pins 55 may be automatically supplied. However, if such a hydraulic chuck mechanism is mounted to the carrier 3, the hydraulic chuck must be mounted in a limited space or the rotatable carrier 3 must be equipped with auxiliary machinery including hydraulic piping and the like. Hence, the grinding apparatus as a whole has an extremely complicated arrangement and besides, is increased in cost.

In contrast, the grinding apparatus according to the embodiment permits the load pin 55 to be removably retained by way of the relatively simple constitution. Therefore, the grinding apparatus may be readily redesigned for automatically supplying the load pins to the carrier 3 without employing the complicated mechanism.

While the foregoing embodiments employ the leaf spring as the holder member 33, any material that is elastically deformable and is capable of removably clamping the load pin 55 may be used. For instance, a resin material or the like may be employed. In addition, the configuration of the holder member 33 is not limited to the plate shape and may have any configuration adapted for removably clamping the load pin 55.

The invention claimed is:

1. A grinding apparatus comprising:
a grinding wheel portion which is a rotary member including a pair of grinding surfaces at an outer circumferential area thereof for simultaneously grinding opposite end faces of a pin for use in a power transmission chain as a grinding subject; and
a carrier which includes a pin retainer for retaining the pin in parallel to a rotary axis of the grinding wheel portion as allowing the opposite end faces of the pin to project from the pin retainer, and which is rotated about an axis parallel to the rotary axis of the grinding wheel portion thereby passing the pin retained by the pin retainer through space between the pair of rotated grinding surfaces,
wherein the pin retainer includes: a pin retaining surface against which a first lateral side surface of the pin is pressed and which extends in parallel to the rotary axis of the grinding wheel portion and intersects a direction of grinding the opposite end faces of the pin; and an elastically deformable holder member cooperating with the pin retaining surface to removably clamp the pin pressed against the pin retaining surface,
wherein the carrier has a step structure at an outer periphery thereof, the step structure is defined by a step surface where the holder member is fixed, the pin retaining surface, and an intermediate surface extending between the step surface and the pin retaining surface, and the intermediate surface is not parallel to the step surface and the pin retaining surface, and wherein a second lateral side surface of the pin is pressed against the intermediate surface, and the second lateral side surface of the pin is not parallel to the first lateral side surface of the pin.

2. The grinding apparatus of claim 1, wherein the pin retaining surface is in contact with only opposite end portions of the pin.

3. The grinding apparatus of claim 1, wherein the pin retainer is located at a cut-away structure of the carrier at the outer periphery of the carrier, and the step structure is located at an outer edge of the cut-away structure of the carrier.

4. The grinding apparatus of claim 1, wherein the holder member is a leaf spring, a proximal end of which is fixed to the step surface and a distal end of which opposes the pin retaining surface via a gap therebetween.

5. The grinding apparatus of claim 4, wherein the gap is slightly smaller than a clamp dimension of the pin for use in power transmission chain clamped in the gap.

6. The grinding apparatus of claim 4, wherein the step structure has a recess below the pin retaining surface, the first lateral surface of the pin has a portion covering the recess, and the portion covering the recess is not in contact with the pin retaining surface.

7. A manufacture method of a pin for use in a power transmission chain using the grinding apparatus of claim 1, including a procedure for grinding the opposite end faces of the pin, the method comprising the steps of:

rotating the grinding wheel portion;

clamping the pin between the pin retaining surface and the holder member of the pin retainer so as to be retained in parallel to the rotary axis of the grinding wheel portion as projecting the opposite end faces thereof from the carrier; and rotating the carrier to thereby pass the pin through space between the pair of rotated grinding surfaces.

* * * * *